H. P. C. BROWNE.
ODOMETER OPERATING MEANS.
APPLICATION FILED JULY 31, 1916.

1,361,008.

Patented Dec. 7, 1920.
3 SHEETS—SHEET 1.

WITNESSES:
K. B. Ault

Harry P. C. Browne
INVENTOR

H. P. C. BROWNE.
ODOMETER OPERATING MEANS.
APPLICATION FILED JULY 31, 1916.

1,361,008.

Patented Dec. 7, 1920.
3 SHEETS—SHEET 2.

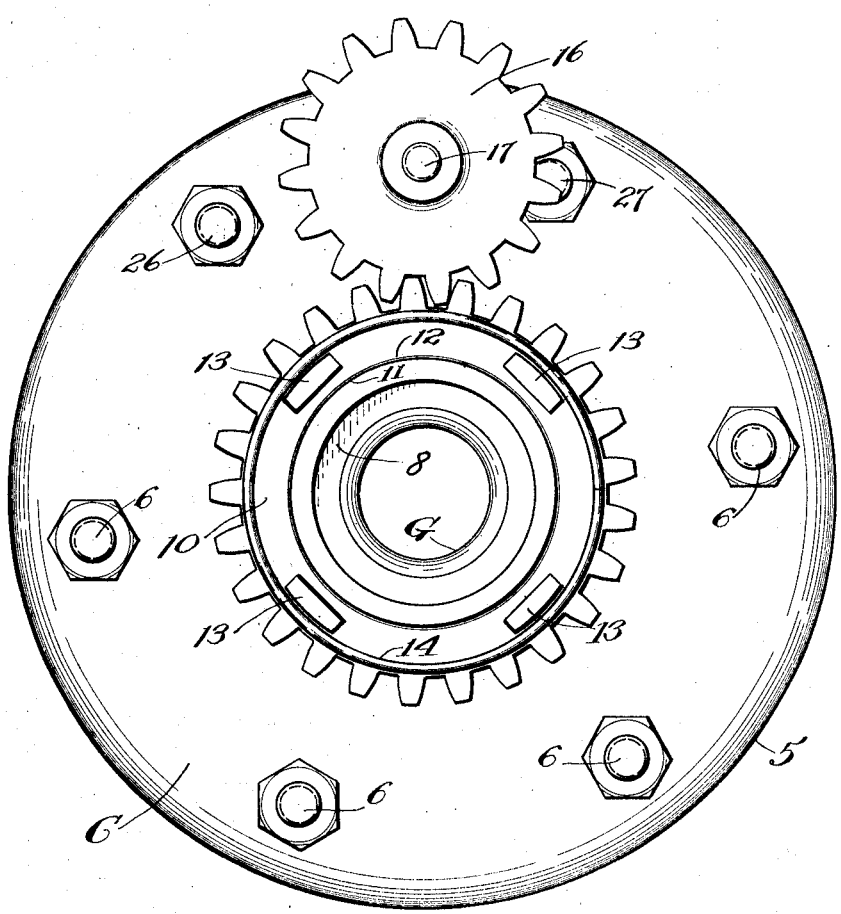

UNITED STATES PATENT OFFICE.

HARRY P. C. BROWNE, OF NEW YORK, N. Y.

ODOMETER-OPERATING MEANS.

1,361,008.  Specification of Letters Patent.  Patented Dec. 7, 1920.

Application filed July 31, 1916. Serial No. 112,293.

*To all whom it may concern:*

Be it known that I, HARRY P. C. BROWNE, a citizen of the United States, residing at New York, in the county and State of New York, have invented certain new and useful Improvements in Odometer-Operating Means; and I do hereby declare the following to be a full, clear, and exact description of the invention, such as will enable other skilled in the art to which it appertains to make and use the same.

My invention relates to improvements in an apparatus for operating any rotation indicating or registering instrument, by imparting a measure of the relative rotation between a shaft or an axle and a wheel journaled thereon, to an instrument of said class carried by the wheel.

One of the important objects of my invention is the provision of means for installing any of said or analogous instruments upon a vehicle wheel, in a position sheltered from chance collision and in which position the instrument is readily accessible from the outer side of the wheel for reading or other attention.

Another object of the invention is to provide a mechanical train for operating instruments, as above described and mounted, from the wheel-axle; the inter-connection of all the parts of which shall be unaffected by any accidental dislocations occurring between the wheel and its axle.

My present invention is analogous to and is intended to serve the same general purposes as the apparatus shown in my application Serial Number 75,558, filed February 1st, 1916; and is distinctively though not exclusively adapted for use with wheels having plain as distinguished from roller bearings.

To the accomplishment of these objects and such others as may hereinafter appear, my invention comprises the novel construction and combination of parts hereinafter described and pointed out in the appended claim, reference being had to the accompanying drawings.

Figure 1:
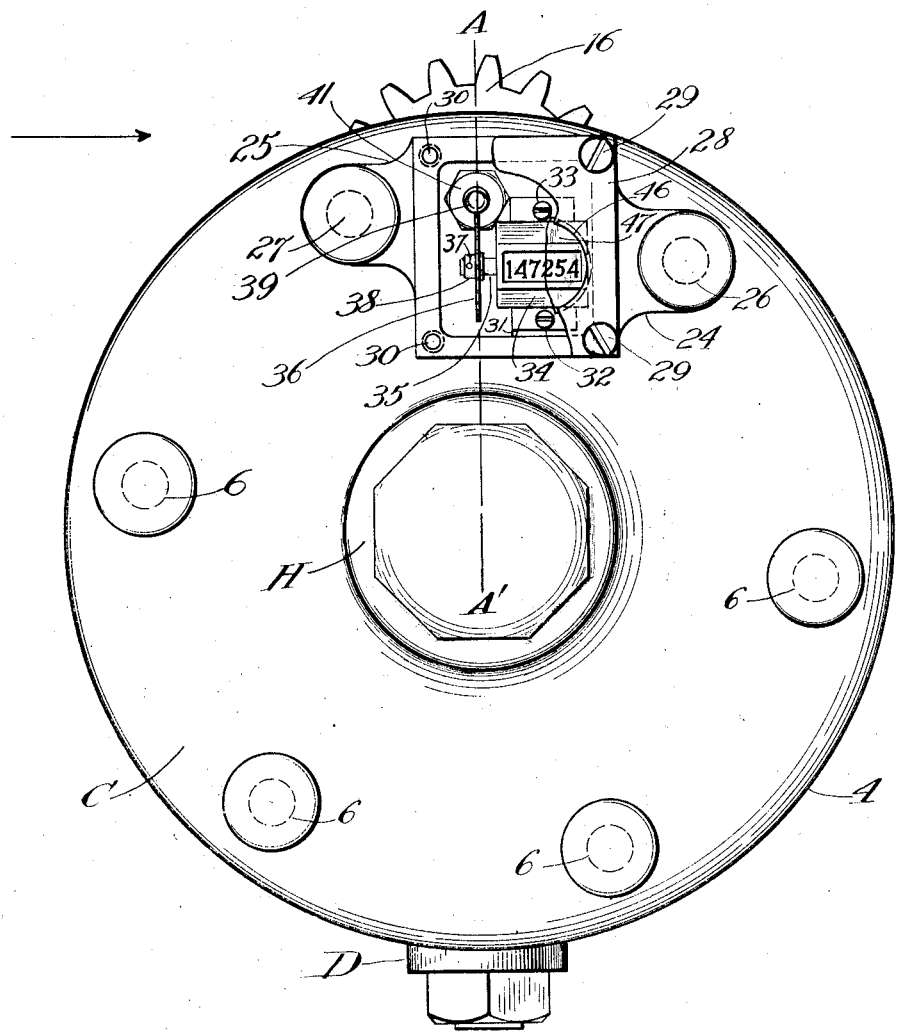
Figure 2:
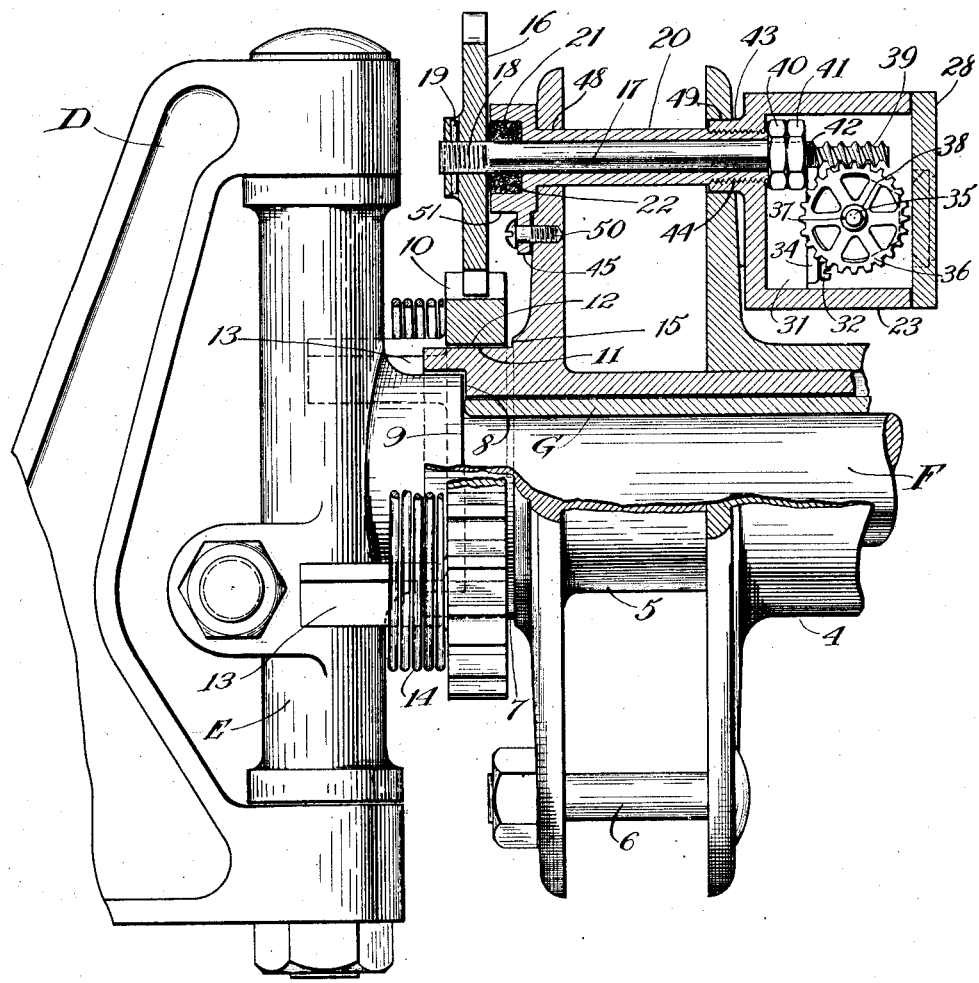

In the drawings in which the same reference characters designate like parts throughout the several views, Figure 1 is a front elevation of the device in place upon an automobile front wheel-hub. Fig. 2 is in part a side elevation of the wheel-hub and steering knuckle on which same is mounted, portions of parts to the right being broken away, and other portions being broken away to show a section on the line A—A' of Fig. 1, seen in the direction of the arrow. Fig. 3 is an elevation of the device in place on the wheel, but seen from the rear and with the axle withdrawn from the wheel. In the drawings the wheel spokes are omitted for the sake of clearness.

Referring to the drawings; C is an automobile wheel-hub, comprising the usual artillery type flanges 4 and 5, connected across the spokes by flange bolts as at 6. D is the fork of an automobile axle steering-head, E being the pivot and F the axle-stub thereof. G is a bushing or liner commonly used to reduce the friction between the wheel and axle, and H is a hub-cap usually placed over the outer end of a hub. Formed integrally with the flange 5 is a collar 7, recessed and faced as at 8, to locate the inboard thrust of the wheel against a shoulder 9 of the axle-stub. Upon the external periphery of collar 7, is rotatably mounted the gear 10; preferably a race or journal 11, concentric with the wheel, being machined thereon to receive the gear. The gear 10 is of the spur tooth type and is provided with a concentric cylindrical opening 12, adapted to journal upon the race 11; the gear being thus centered about the axis of the wheel. Laterally projecting arms 13, of which four are shown loosely embrace the pivot E in pairs at top and bottom and serve to restrain the gear 10 against angular movement, but permit it to follow otherwise the movements of the wheel. A helical spring 14, having a tendency to expand in the direction of the axle axis, serves to hold the gear 10 sidewise in position against a thrust shoulder 15 at the inner end of race 11. It is to be noted that gear 10 is thus constrained to a definite location with respect to the wheel-hub, and will therefore, regardless of whatever lost motion may exist between the wheel and its axle, remain in mesh with a second gear 16 supported exclusively by the wheel-hub. The gear 16 transmits motion derived by it from the gear 10 through the rotary movement of the wheel, to a counting mechanism in the housing on the outer face of the wheel, by the shaft 17 to which it is secured by means of the screw threads 18 of the shaft and the pin 19. Shaft 17 is journaled in an elongated bushing 20 which traverses the hub through holes in the flanges as at 48 and 49. At its gear or inboard end the bushing 20 has a head 51 in which is an annular recess 21, filled with a plastic material 22 preferably under compression which acts to prevent the passage of axle oil or like matter into the bushing, and thence to the counting instrument where its presence would be harmful. On the front of flange 4 is a housing 23, provided with attaching lugs 24 and 25 through which special flange bolts 26 and 27, of slightly greater length than standard, pass and secure the housing in place. The housing 23 is sealed by a cover plate 28, part of which is broken away in Fig. 1, and which is held by screws as at 29 in the tapped holes 30. Within the housing and mounted upon a pedestal 31 by screws 32 and 33, is a counter 34 of a well known self contained type inclusive of a shaft 35 by which it is operated. A gear 36 fitting shaft 35 and secured thereto by pin 37 passing through hub 38, meshes with a worm-thread 39 on the shaft 17. The shaft 17 is located in position by nuts 40 and 41 engaging the screw threads 42 of the spindle. 43 is a circular boss formed on the back of housing 23, fitting loosely in a hole in the flange 4, as at 49, and having screw threads as at 44, which threads receive the correspondingly threaded end of bushing 20. On the bushing head 51 is a lug 45 through which a screw 50 is tapped into the flange wall, thus holding the bushing against any tendency to turn or disengage from the housing. A window 46, closed by a transparent substance as the glass 47, shown partly broken away in Fig. 1, is provided in the cover 28 opposite the counter and displays the figures thereof to view.

It will be seen from the construction described that if the wheel be turned upon the axle, as by the movement of the vehicle, the engagement by the gear 10, which is held stationary by arms 13, of the pinion 16 causes the latter to turn, thereby rotating the shaft 17 and communicating to the counter 34 the desired measure or other indication of the revolution of the wheel.

It is to be noted as one of the principal points of my invention that all the members of the driving train from wheel to counter, have their entire support upon a single individual member of the vehicle and form therefore a self-contained arrangement, dependent in no way for operative integrity upon the relation between parts of the machine to which the device is applied. In this respect it differs materially from devices of similar purpose and likewise employing in the form of a couple, a driving gear and a pinion driven thereby, located, when used upon an automobile, adjacent to the steering knuckle. In this latter type the driving gear is supported by the vehicle wheel, ordinarily by lugs not adapted to center it on the wheel axis; the driven pinion is independently supported by a system of bracketing attached to the steering knuckle; and the recording instrument is usually remote from its driving pinion being operated by a flexible shafting. This arrangement presents difficulties, arising from broken shafting, disconnection due to lost motion between wheel and axle, and the weakening of the bracketing, all of which are eliminated in the construction shown in the present invention.

I am aware that it is not new to mount a recording or similar instrument upon a wheel-hub, an example of such practice being the hub-odometer, for which, also, the advantages above pointed out as appurtenant to my present invention might be claimed, but instruments of the class named are unduly exposed to accidents, and are confined by reason of their exposure to very small dimensions unsuited to any but simple mileage recorders. In contrast with these limitation my present invention presents ample space and protection and high speed direct drive essential to the more comprehensive registering or recording instruments.

Various changes may be made in my improved arrangement without departing from the scope of my invention, and I do not limit myself to the details herein shown and described.

Having thus described my invention, what I claim and desire to secure by Letters Patent of the United States, is;

In a device of the class described, an axle, a steering head fork, an elongated bearing carried by said fork, a stub shaft fixed to the fork, a hub journaled on said shaft, said hub including annular flanges spaced apart, and the inner end of the hub being formed into a race, off-set to form an annular shoulder, a registering mechanism supported by one of said flanges, an actuating device carried by the other flange and operatively connected with and driving said mechanism, a spur gear loosely mounted with respect to the hub on said race, a yieldable seat interposed between said gear and said elongated bearing, and holding the gear yieldingly against said shoulder, retaining arms carried by said gear and embracing said elongated bearing to prevent the rotation of said gear, said gear being operatively connected with and driving said actuating device as the hub rotates.

In testimony whereof I affix my signature in presence of two witnesses.

HARRY P. C. BROWNE.

Witnesses:
E. B. COLGIN,
CHAS. O. GUYNES.